United States Patent
Wang (10) Patent No.: US 7,113,860 B2
(45) Date of Patent: Sep. 26, 2006

(54) CRUISE CONTROL WARNING SYSTEM

(75) Inventor: Jenne-Tai Wang, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/768,384

(22) Filed: Jan. 30, 2004

(65) Prior Publication Data
US 2005/0171674 A1    Aug. 4, 2005

(51) Int. Cl.
*B60T 8/32*    (2006.01)
*B60T 8/24*    (2006.01)
*G05D 1/00*    (2006.01)

(52) U.S. Cl. ................... 701/93; 701/97; 180/171
(58) Field of Classification Search .............. 701/93, 701/97; 180/171
See application file for complete search history.

(56) References Cited

U.S. PATENT DOCUMENTS

| | | | |
|---|---|---|---|
| 4,951,208 A * | 8/1990 | Etoh ............................. 701/97 |
| 5,908,457 A * | 6/1999 | Higashira et al. ............. 701/41 |
| 5,978,737 A | 11/1999 | Pawlowski et al. ......... 701/301 |
| 6,006,144 A * | 12/1999 | Takahashi et al. ............. 701/1 |
| 6,060,989 A | 5/2000 | Gehlot ......................... 340/576 |
| 6,263,282 B1 | 7/2001 | Vallancourt .................. 701/301 |
| 6,484,082 B1 | 11/2002 | Millsap et al. ................. 701/48 |
| 6,556,915 B1 | 4/2003 | McCurdy ....................... 701/97 |
| 2002/0095255 A1* | 7/2002 | Minowa et al. ............... 701/96 |
| 2003/0168271 A1* | 9/2003 | Massen ...................... 180/167 |
| 2004/0061600 A1* | 4/2004 | Wehner et al. .............. 340/435 |
| 2004/0073367 A1* | 4/2004 | Altan et al. .................. 701/301 |

OTHER PUBLICATIONS

"Caution Cruise Control Can Be Dangerous", 2003 Chevy Malibu Owner's Manual, p. 3-9.

* cited by examiner

*Primary Examiner*—Thomas G. Black
*Assistant Examiner*—Brian J. Broadhead
(74) *Attorney, Agent, or Firm*—Kathryn A. Marra (57) ABSTRACT

A method for providing a cruise control warning system including monitoring a cruise control system to determine if the cruise control system is activated or deactivated for a vehicle. The method also includes receiving vehicle operation data for the vehicle. A likelihood that a slippery road condition exists for the vehicle is determined based on the vehicle operation data. A warning message is indicated to a driver of the vehicle when it has been determined that the likelihood that a slippery road condition exists is over a first pre-selected value and the cruise control system is activated.

19 Claims, 6 Drawing Sheets

CRUISE CONTROL WARNING SYSTEM

BACKGROUND OF THE INVENTION

The present disclosure relates generally to a cruise control warning system and in particular, to a method of warning a driver of a vehicle being operated with cruise control activated when there is a possibility of a slippery road condition.

Many vehicles currently being manufactured contain cruise control systems. Cruise control systems control a vehicle cruising speed to maintain a desired cruising speed of a vehicle. The cruise control systems are operatively connected to the vehicle throttle and operate the throttle automatically in order to maintain the desired cruising speed of the vehicle. A newer generation of cruise control is adaptive cruise control that automatically adjusts vehicle speed to maintain a driver-selected distance from the vehicle ahead in the same lane. The adaptive cruise control system can slow the vehicle down when slow moving traffic is encountered and then can return the vehicle to a set speed when the traffic clears. An adaptive cruise control system uses forward-looking radar (to sense traffic ahead), as well as yaw and steering data to determine which targets are in the predicted path of the vehicle.

It is well known that cruise control systems should not be used, or activated, in certain driving conditions, including heavy traffic, winding roads and slippery roads. Winding roads and heavy traffic driving conditions may promote the use of brakes, which in turn will automatically cut off most cruise control systems. Slippery roads can be caused by road conditions such as snow, ice, slush and rain, and may result in a fast change in tire traction on a vehicle. These slippery road conditions can cause low road traction situations to which a driver must react quickly. Although cruise control can manually be cut off by the driver tapping the brake pedal, the driver must first recognize that these slippery road conditions exist and/or that the vehicle has begun to spin or slide, and then the driver must bring his foot up off the floor to the brake pedal to disengage the cruise control. It may be advantageous to either eliminate the ability to use cruise control or to warn the driver about slippery road conditions while using cruise control under a set of certain predetermined vehicle, weather, and road conditions.

BRIEF DESCRIPTION OF THE INVENTION

An exemplary embodiment of the present invention includes a method for providing a cruise control warning system. The method includes monitoring a cruise control system to determine if the cruise control system is activated or deactivated for a vehicle. The method also includes receiving vehicle operation data for the vehicle. A likelihood that a slippery road condition exists for the vehicle is determined based on the vehicle operation data. A warning message is indicated to a driver of the vehicle when it is determined that the likelihood that a slippery road condition exists is over a first pre-selected value and the cruise control system is activated.

In another aspect, a method for providing a cruise control warning system includes monitoring a cruise control system to determine if the cruise control system is activated or deactivated for a vehicle. The method also includes receiving vehicle operation data for the vehicle. A likelihood that a slippery road condition exists for the vehicle is determined based on the vehicle operation data. A command to disable the cruise control system is transmitted when it is determined that the likelihood that a slippery road condition exists is over a pre-selected value and the cruise control system is activated.

In another aspect, a cruise control warning method includes monitoring a cruise control system to determine if the cruise control system is activated or deactivated for a vehicle. The method also includes receiving vehicle operation data for the vehicle. A likelihood that a condition adverse to the use of cruise control exists for the vehicle is determined based on the vehicle operation data. A warning message is indicated to a driver of the vehicle when it is determined that the likelihood of a condition adverse to the use of cruise control is over a first pre-selected value and the cruise control system is activated.

In another aspect, a cruise control warning system includes a network and a microprocessor in communication with the network. The microprocessor includes instructions to implement a method including monitoring a cruise control system to determine if the cruise control system is activated or deactivated for a vehicle. The method also includes receiving vehicle operation data for the vehicle via the network. A likelihood that a slippery road condition exists for the vehicle is determined based on the vehicle operation data. A warning message is indicated via the network to a driver of the vehicle when it is determined that the likelihood that a slippery road condition exists is over a first pre-selected value and the cruise control system is activated.

In a further aspect, a cruise control warning system includes a network and a microprocessor in communication with the network. The microprocessor includes instructions to implement a method including monitoring a cruise control system to determine if the cruise control system is activated or deactivated for a vehicle. The method also includes receiving vehicle operation data for the vehicle via the network. A likelihood that a slippery road condition exists for the vehicle is determined based on the vehicle operation data. A command is transmitted via the network to disable the cruise control system when it is determined that the likelihood that a slippery road condition exists is over a pre-selected value and the cruise control system is activated.

In still another aspect, a computer program product for implementing a cruise control warning system includes a storage medium readable by a processing circuit and storing instructions for execution by the processing circuit for performing a method. The method includes monitoring a cruise control system to determine if the cruise control system is activated or deactivated for a vehicle. The method also includes receiving vehicle operation data for the vehicle. A likelihood that a slippery road condition exists for the vehicle is determined based on the vehicle operation data. A warning message is indicated to a driver of the vehicle when it is determined the likelihood that a slippery road condition exists is over a first pre-selected value and the cruise control system is activated.

Other systems, methods and/or computer program products according to embodiments will be or become apparent to one with skill in the art upon review of the following drawings and detailed description. It is intended that all such additional systems, methods, and/or computer program products be within the scope of the present invention, and be protected by the accompanying claims.

BRIEF DESCRIPTION OF THE DRAWINGS

Referring to the exemplary drawings wherein like elements are numbered alike in the several FIGURES.

DETAILED DESCRIPTION OF THE INVENTION

An exemplary embodiment of the present invention is a method to caution a driver of a vehicle and/or to disable a cruise control system in the vehicle when a slippery road condition is likely. An exemplary embodiment of the present invention determines that the possibility of a motor vehicle driving on slippery roads is high when at least one of the following conditions is met: slippery roads, rain or snow is broadcast by an on vehicle broadcast service (e.g., ONSTAR) for the area where the vehicle is located (global positioning service (GPS) is used here to locate the vehicle); interior temperature control is on high; exterior temperature is below freezing; front or rear defogger or defroster is on; windshield wipers are on (excluding washing mode) for a period of "x" minutes (e.g., "x" is equal to one minute) during the last "y" minutes (e.g., "y" is equal to ten minutes); and a low road traction and/or wheel spinning is detected in the last "z" minutes (e.g., "z" is equal to ten minutes).

Exemplary embodiments of the present invention rely on indirect measures (e.g., windshield wipers turned on, outside air temperature) that may provide some indication that a slippery road condition exists at the present moment. In addition, exemplary embodiments of the present invention rely on indirect measures that may provide some indication that a slippery road condition is likely to exist in the near future. In most cases, the indirect measures utilized by the present invention are measures that are readily available in the vehicle and the determination that a slippery road condition may exist is relatively straightforward. In contrast, using a direct measure of traction to predict a slippery road condition may require the collection of a large amount of new and/or existing data and the performance of complicated calculations.

Any data that is available to the vehicle that may be useful in predicting driving conditions may be utilized (e.g., rain sense sensor data, wheel spin sensor data, vehicle stability enhancement system (VSES) data, sensors such as radars or cameras to see rain and/or snow) by exemplary embodiments of the present invention. Once a high likelihood of a slippery road driving condition is detected, a warning to discontinue cruise control use will be displayed to the driver of the vehicle and/or the cruise control system will be disabled.

Figure 1:
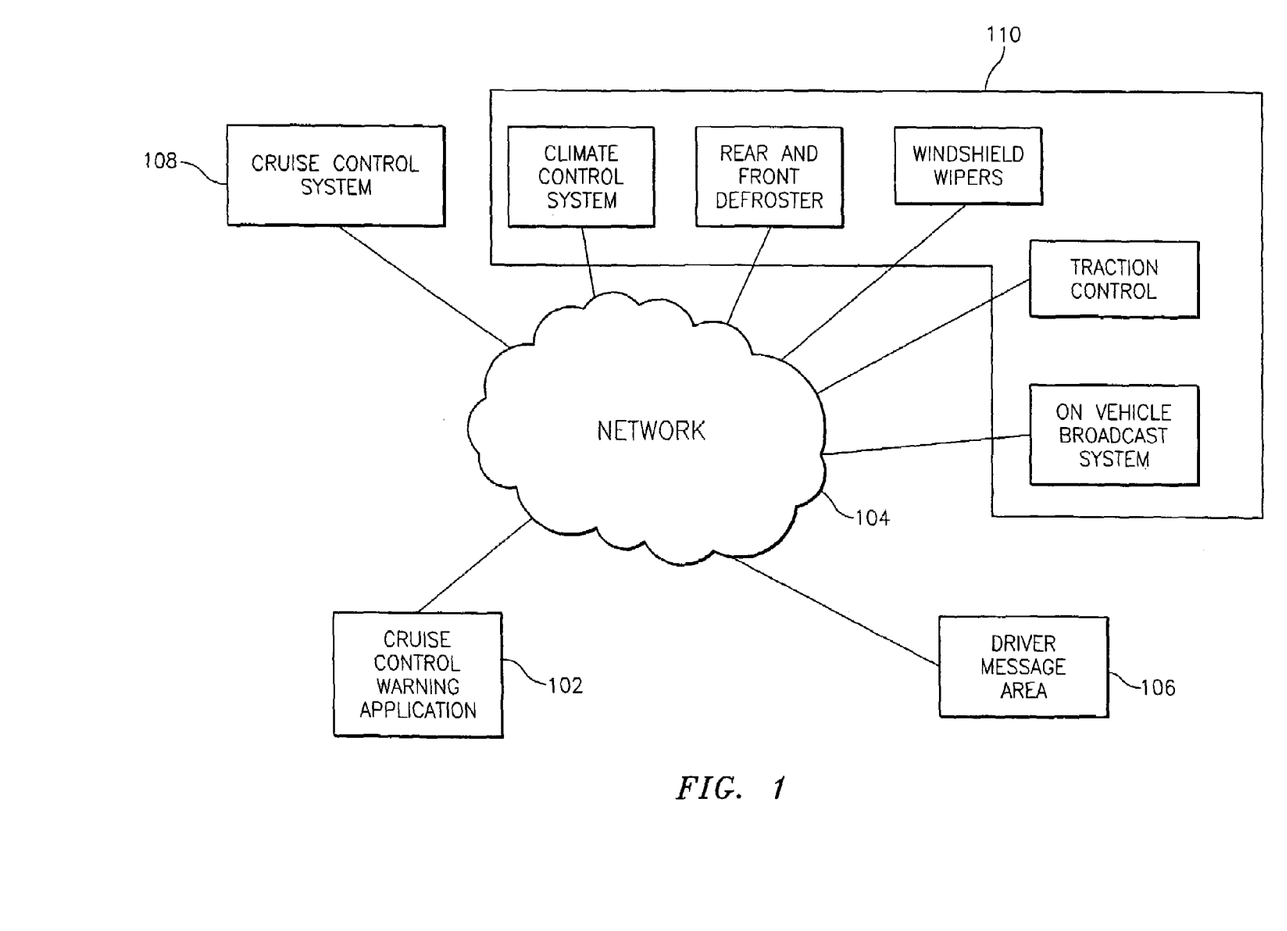
FIG. 1 is a block diagram of an exemplary cruise control warning system.

FIG. 1 is a block diagram of an exemplary cruise control warning system. The cruise control warning system includes vehicle control modules 110 for a vehicle. The vehicle control modules 110 are in communication with a network 104 for communicating vehicle operation data (e.g., real-time and near real-time) from the vehicle control modules 110 to a cruise control warning application 102. In exemplary embodiments of the present invention, the cruise control warning application 102 is located on a microprocessor within the vehicle. The cruise control warning application 102 includes computer instructions to receive the vehicle operation data, to determine the likelihood that slippery road conditions exist based on the vehicle operation data, and then to send a warning message to the driver message area 106 and/or a command to deactivate the cruise control system 108 depending on the likelihood that a slippery road condition exists. The microprocessor may be dedicated to performing the cruise control warning application 102 functions, or alternatively, the microprocessor may include application code for performing other vehicle functions along with the cruise control warning application 102 functions. In addition, storage space for intermediate application results, as well as application inputs and outputs may be located on the microprocessor or located on an external storage device accessible by the microprocessor.

The vehicle control modules 110, as depicted in FIG. 1, include control modules for a climate control system, a rear and front defroster, windshield wipers, a traction control system and an on vehicle broadcast system (e.g., ONSTAR®). In addition, FIG. 1 includes a cruise control system 108 that is in communication with the network 104. The cruise control warning application 102 may transmit a disable command to the cruise control system 108 via the network 104. FIG. 1 depicts a driver message area 106 in communication with the network 104 where status messages or warnings may be sent and presented to the driver of the vehicle. The driver message area 106 may communicate to the driver of the vehicle in any manner known in the art including voice, graphics and text.

The cruise control warning system depicted in FIG. 1 also includes a network 104 for transmitting data and commands between the vehicle control modules 110, the cruise control system 108, the cruise control warning application 102 and the driver message area 106. In exemplary embodiments of the present invention, the network 104 is an existing communication bus that is internal to the vehicle. In alternate exemplary embodiments of the present invention, the network 104 includes access to data from outside the vehicle. In still further exemplary embodiments of the present invention, one or more of the vehicle control modules 110, the cruise control system 108, the cruise control warning application 102 and the driver message area 106 are directly connected to each other and no network is required between the directly connected system components.

Figure 2:
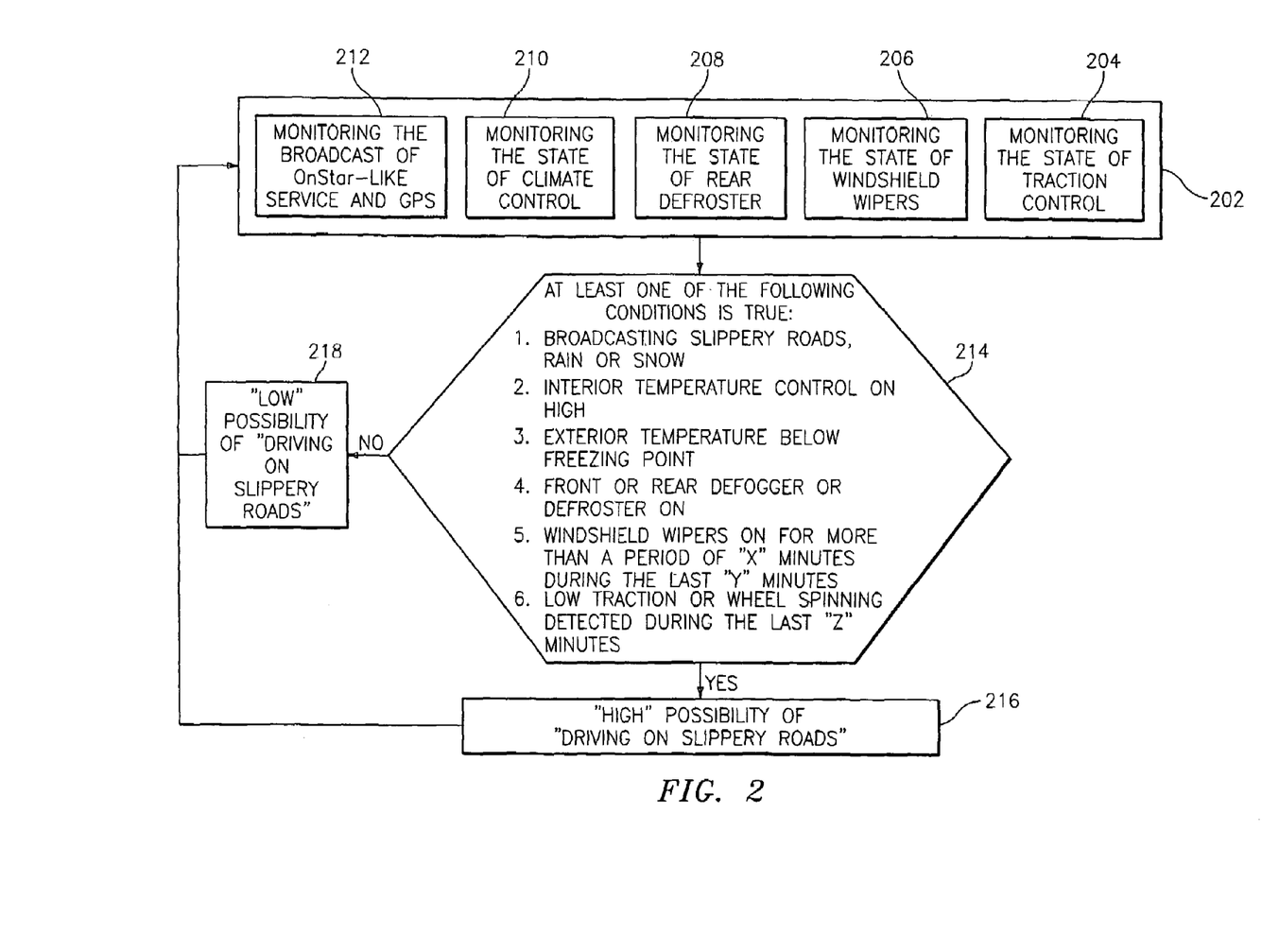
FIG. 2 is a block diagram of an exemplary process flow for calculating the likelihood that a vehicle is being driven on slippery roads.

FIG. 2 is a block diagram of an exemplary process flow for calculating the likelihood that a vehicle is currently or will soon be driving on a slippery road. An input box 202 includes one or more vehicle control modules 110 being monitored for input to step 214. A broadcast from a vehicle broadcast system service (e.g., ONSTAR®) is monitored at box 212 and utilized along with GPS data to determine if the vehicle is in a location where conditions such as slippery roads, rain and/or snow are being reported. The state of a climate control system is monitored at box 210 to determine if the interior temperature control is on high. At box 208, the state of a rear defroster is monitored, at 206 the state of the windshield wipers are monitored and at box 204 the state of traction control is monitored. The vehicle operation data from the monitoring performed within the input box 202 is input to step 214 to determine the likelihood that a slippery road condition exists for the vehicle.

At step 214, a check is made to determine if at least one of the following conditions are true: slippery roads, rain or snow is broadcast for the area where the vehicle is currently located; interior temperature control is on high; exterior temperature is below freezing; front or rear defogger or defroster is on; windshield wipers are on (excluding washing mode) for a period of "x" minutes (e.g., "x" is equal to one minute) during the last "y" minutes (e.g., "y" is equal to ten minutes); and low road traction and/or wheel spinning is detected in the last "z" minutes (e.g., "z" is equal to ten minutes). If one of the conditions listed in step 214 is true, then at step 216 likelihood that the vehicle is being driven under slippery road conditions is set to high. Processing then continues to input box 202 where the vehicle control modules 110 are monitored and the input to step 214 is refreshed. If none of the conditions listed in step 214 are true, then at step 218 the likelihood that the vehicle is being driven on slippery road conditions is set to low. Processing then continues to input box 202 where the vehicle control modules 110 are monitored and the input to step 214 is refreshed. The process described in FIG. 2 continues while a vehicle is in operation. The likelihood of driving on slippery roads is determined on a real-time or near real-time basis in response to monitoring data obtained from the input box 202.

Figure 3:
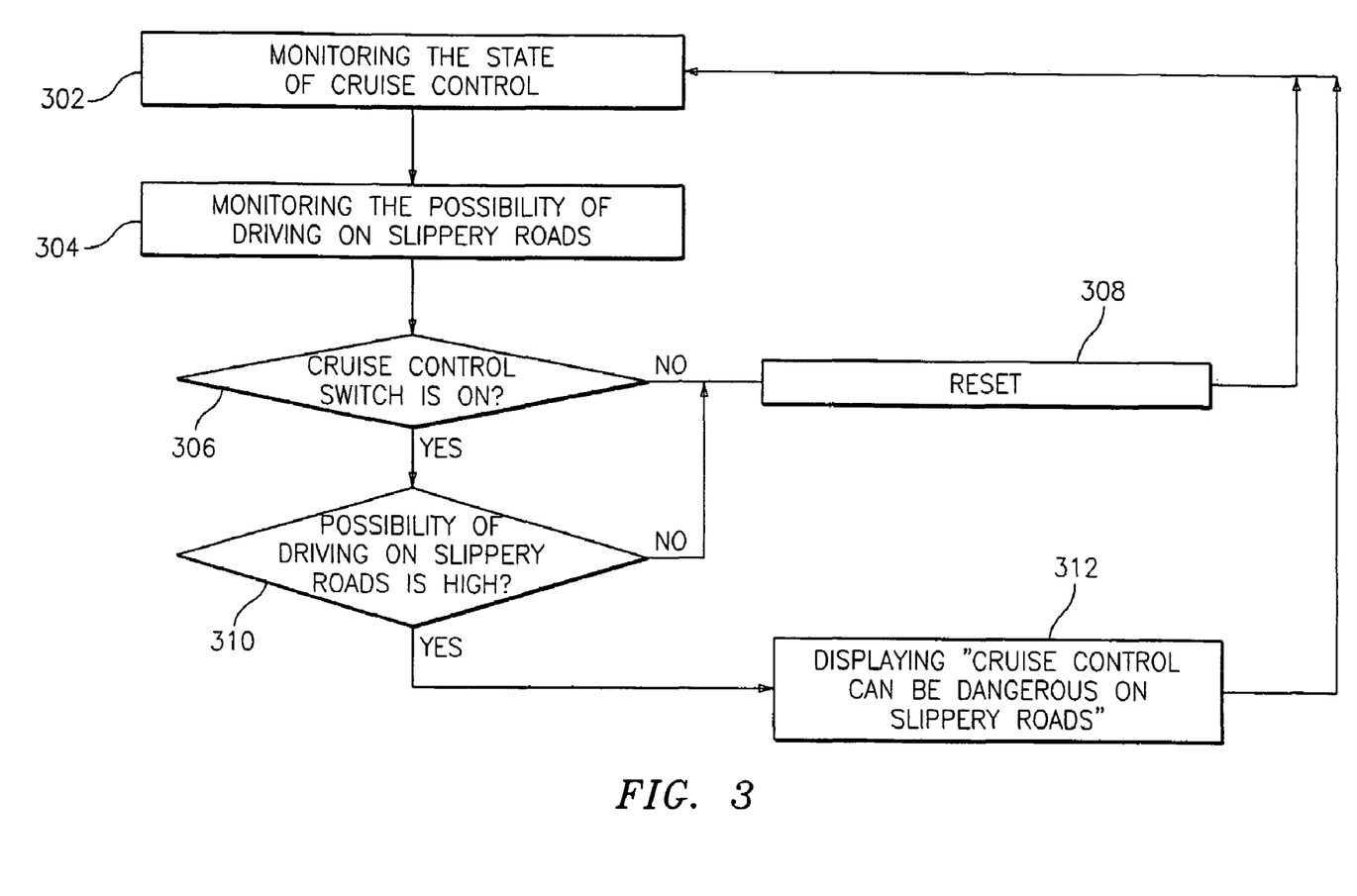
FIG. 3 is a block diagram of an exemplary process flow for displaying a warning message to a driver of a vehicle when the likelihood of driving on slippery roads is high.

FIG. 3 is a block diagram of an exemplary process flow for displaying a warning message to a driver of a vehicle when the likelihood of driving on a slippery road is high. At step 302, the state of the cruise control system 108 is monitored to determine if the cruise control system 108 is activated or deactivated. At step 304, the likelihood of driving on a slippery road is monitored, as described in reference to FIG. 2. At step 306, it is determined if the cruise control switch is on. If the cruise control system 108 is activated, as determined at step 306, then step 310 is performed to determine if the likelihood of driving on a slippery road is high. If the likelihood of driving on slippery roads is high, then step 312 is performed to display the message "cruise control can be dangerous on slippery roads" in the driver message area 106. Processing then continues at step 302 with monitoring the state of the cruise control system 108.

If, at step 306, it is determined that the cruise control system 108 is not activated, then step 308 is performed to reset the display in the driver message area 106 to blank. Processing then continues at step 302 with monitoring the state of the cruise control system 108. If, at step 310, it is determined that the likelihood of driving on a slippery road is low, then step 308 is performed to reset the display in the driver message area 106 to blank. Processing then continues at step 302, with monitoring the state of the cruise control system 108. In exemplary embodiments of the present invention, the processing described in reference to FIG. 3 is performed while the vehicle is in operation.

Figure 4:
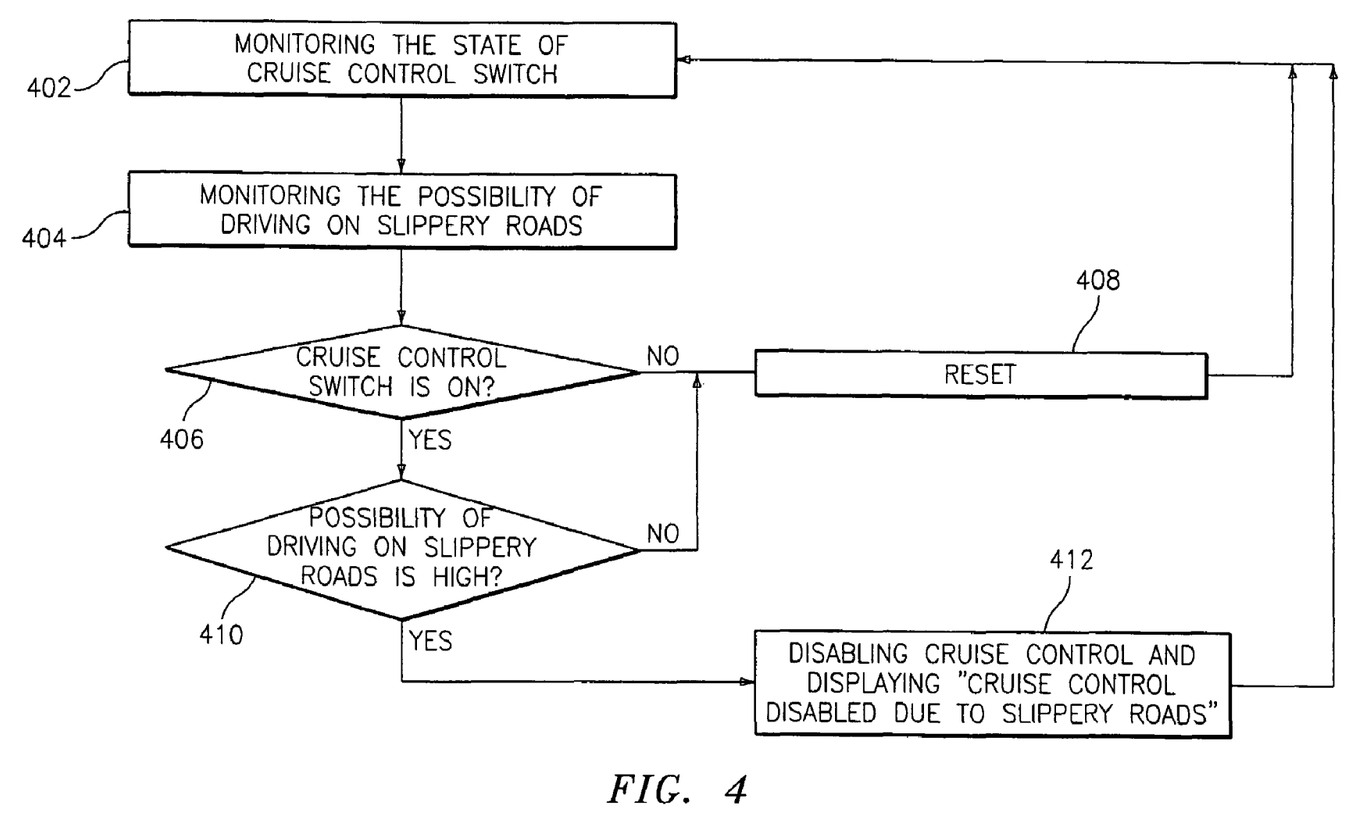
FIG. 4 is a block diagram of an exemplary process flow for disabling cruise control when the likelihood of driving on slippery roads in high.

FIG. 4 is a block diagram of a process flow for an alternate embodiment of the present invention that includes disabling the cruise control system 108 when the likelihood of driving on a slippery road is high. At step 402, the state of the cruise control system 108 is monitored to determine if the cruise control system 108 is activated or deactivated. At step 404, the likelihood of driving on a slippery road is monitored, as described in reference to FIG. 2. At step 406, it is determined if the cruise control switch is on. If the cruise control system 108 is activated, as determined at step 406, then step 410 is performed to determine if the likelihood of driving on a slippery road is high. If the likelihood of driving on a slippery road is high, then step 412 is performed to disable the cruise control system 108 and to display the message "cruise control disabled due to slippery roads" in the driver message area 106. Processing then continues at step 402 with monitoring the state of the cruise control system 108.

If, at step 406, it is determined that the cruise control system 108 is not activated, then step 408 is performed to reset the display in the driver message area 106 to blank. Processing then continues at step 402 with monitoring the state of the cruise control system 108. If, at step 410, it is determined that the likelihood of driving on a slippery road is low, then step 408 is performed to reset the display in the driver message area 106 to blank. Processing then continues at step 402 with monitoring the state of the cruise control system 108. In exemplary embodiments of the present invention, the processing described in reference to FIG. 4 is performed while the vehicle is in operation.

Exemplary embodiments of the present invention assign a probability value to the likelihood of driving under slippery road conditions. For example, if one of the conditions listed in step 214 is true, a value of one hundred percent may be assigned to the likelihood of driving under slippery road conditions. Similarly, if none of the conditions listed in step 214 are true, then a value of zero percent may be assigned to the likelihood of driving under slippery road conditions. The likelihood, or probability is then compared to a pre-selected value to determine what action to take (e.g., warning message, disable cruise control).

Figure 5:
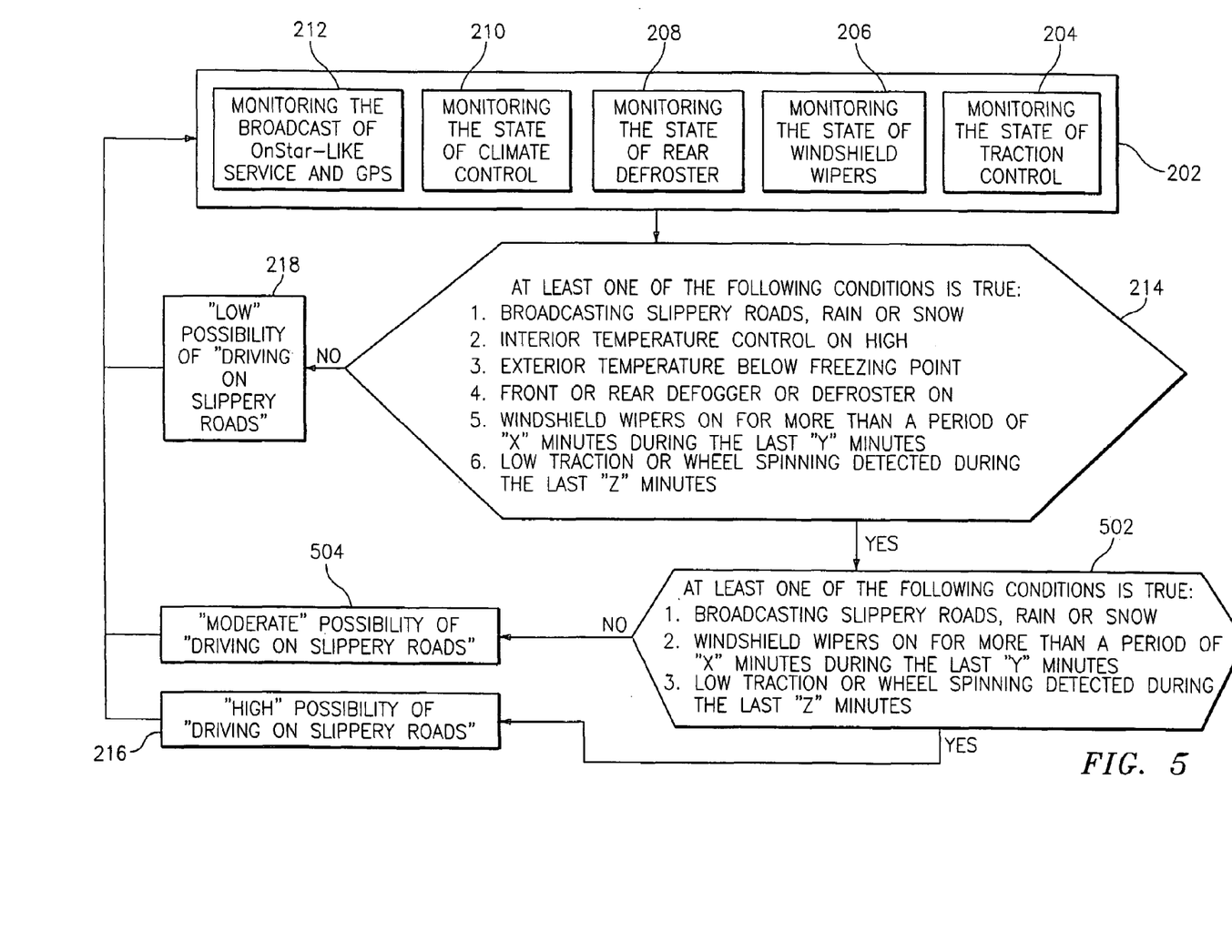
FIG. 5 is a block diagram of an exemplary process flow for calculating whether the likelihood that a vehicle is being driven on slippery roads is low, moderate or high.
Figure 6:
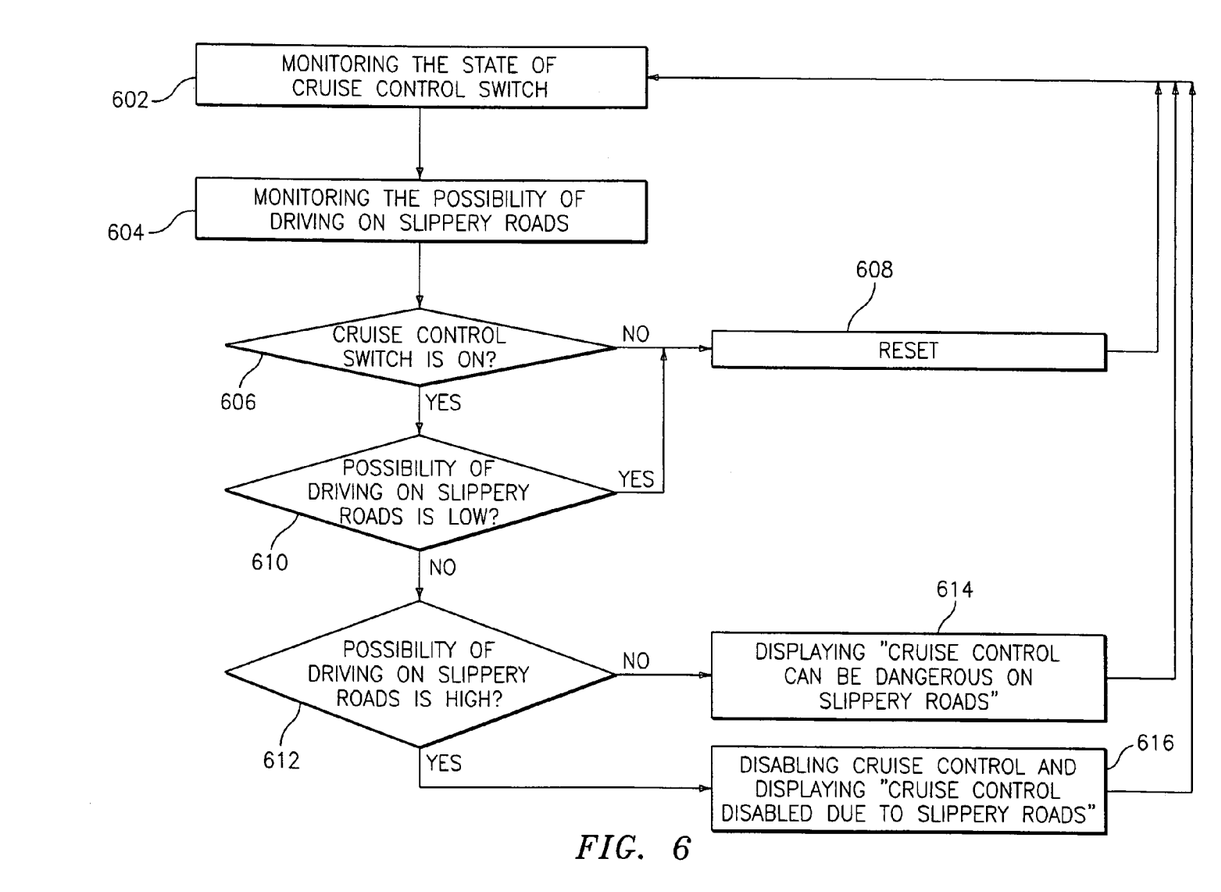
FIG. 6 is a block diagram of an exemplary process flow for displaying a warning message to a driver of a vehicle and/or disabling the cruise control system when the likelihood of driving on slippery roads is moderate or high.

In alternate exemplary embodiments, such as the one depicted in FIGS. 5 and 6, a more granular approach is taken and the detection of a particular condition or a combination of particular conditions listed in step 214 will lead to a higher likelihood of driving under slippery road conditions. For example, the combination of slippery roads, rain or snow is broadcast for the area where the vehicle is currently located and low road traction and/or wheel spinning being detected may result in a ninety percent likelihood of driving under slippery road conditions. Detecting only the condition that the interior temperature control is on high may result in a forty percent likelihood of the vehicle being driving under slippery road conditions. The likelihood or percent may be compared to a pre-selected value to determine what action to take (e.g., disable cruise control, send a warning message to the driver). For a lower likelihood value a warning message may suffice, while for a higher likelihood value the cruise control system 108 may also be disabled. In exemplary embodiments of the present invention, the pre-selected value is set to an initial value and then adjusted by the driver based on driver preference.

FIG. 5 is a block diagram of an alternate exemplary embodiment of the present invention for calculating whether the likelihood that a vehicle is being driven on slippery roads is low, moderate or high. FIG. 5 is similar to FIG. 2 and includes the same input box 202 with the same vehicle control modules 110 being monitored. Similar to the process described in reference to FIG. 2, the vehicle operation data from the monitoring performed within the input box 202 is input to step 214 to determine if there is a low likelihood that a slippery road condition exists for the vehicle. If none of the conditions listed in step 214 are true, then at step 218 the likelihood that the vehicle is being driven on slippery road conditions is set to low. Processing then continues to input box 202 where the vehicle control modules 110 are monitored and the input to step 214 is refreshed.

If at least one of the conditions listed in step 214 is true, then step 502 is performed to determine whether the likelihood of driving on slippery roads is moderate or high. At step 502, a check is made to find out if at least one of the following conditions are true: slippery roads, rain or snow is broadcast for the area where the vehicle is currently located; windshield wipers are on (excluding washing mode) for a period of "x" minutes (e.g., "x" is equal to one minute) during the last "y" minutes (e.g., "y" is equal to ten minutes); and a low road traction and/or wheel spinning is detected in the last "z" minutes (e.g., "z" is equal to ten minutes). If at least one of the conditions listed in step 502 is true, then at step 216, the likelihood of driving on a slippery road is set to high. Processing then continues to input box 202 where the vehicle control modules 110 are monitored and the input to step 214 is refreshed. If none of the conditions listed in step 502 are true, then step 504 is performed to set the possibility of driving on slippery roads to moderate. Processing then continues to input box 202 where the vehicle control modules 110 are monitored and the input to step 214 is refreshed. The process described in FIG. 5 continues while the vehicle is in operation. The likelihood of driving on slippery roads is determined on a real-time or near real-time basis in response to monitoring data obtained from the input box 202. Alternate exemplary embodiments of the present invention may utilize other combinations of conditions and/or may assign more than three values to the resulting likelihood.

FIG. 6 is a block diagram of an alternate exemplary process flow for displaying a warning message to a driver of a vehicle and/or disabling the cruise control system when the likelihood of driving on slippery roads is moderate or high. At step 602, the state of the cruise control system 108 is monitored to determine if the cruise control system 108 is activated or deactivated. At step 604, the likelihood of driving on a slippery road is monitored, as described in reference to FIG. 5. At step 606, it is determined if the cruise control switch is on. If the cruise control system 108 is activated, as determined at step 606, then step 610 is performed to determine if the likelihood of driving on a slippery road is low. If the likelihood of driving on slippery roads is low, then step 608 is performed to reset the display in the driver message area 106 to blank, and to enable the cruise control if the cruise control was in the disabled mode. Step 608 is also performed if, at step 606, it is determined that the cruise control switch is not activated. After step 608 is performed, processing continues at step 602 with monitoring the state of the cruise control system 108.

If, at step 610, it is determined that the possibility of driving on slippery roads is not low, then step 612 is performed to determine if the possibility of driving on slippery roads is high. If the possibility of driving on slippery roads is high, then step 616 is performed to disable the cruise control system 108 and to display the message "cruise control disabled due to slippery roads" in the driver message area 106. Processing then continues at step 602 with monitoring the state of the cruise control system 108. If the possibility of driving on slippery roads is not high, as determined at step 612, then the possibility of driving on slippery roads is moderate and step 614 is performed. At step 614, a "cruise control can be dangerous on slippery roads" message is displayed in the driver message area 106 and processing continues at step 602 with monitoring the state of the cruise control system 108. In exemplary embodiments of the present invention, the processing described in reference to FIG. 6 is performed while the vehicle is in operation.

Exemplary embodiments of the present invention may be utilized with standard cruise control systems and/or with adaptive cruise control systems. In both cases, the cruise control warning application may be utilized to augment the existing cruise control system. The cruise control warning application monitors the vehicle operation data from the vehicle to make a prediction about the likelihood that a slippery road condition exits. The result of this prediction may be communicated to the driver of the vehicle and/or the cruise control system 108 may be disabled.

It will be appreciated that there may be other road conditions adverse to the use of cruise control including dirt roads, windy roads, construction and traffic. Exemplary embodiments of the present invention may be utilized to monitor vehicle operation data to determine the likelihood that one of these road conditions are in existence. A warning message may be displayed and/or a cruise control system may be disabled if any likelihood exists or if the likelihood is above a pre-selected threshold.

Exemplary embodiments of the present invention may prevent a driver from utilizing a cruise control system when there is a high likelihood that a slippery road condition exists. In addition, the visual or audio communication of a cruise control warning message may rise the driver's awareness of the suggested rules in the owner's manual for when and when not to engage the cruise control system in the vehicle. This may lead to cruise control systems being utilized at times when they will be most effective. Furthermore, it will be appreciated that the decision to warn the driver of slippery road conditions and/or disabling the cruise control may also take into account the simultaneous driver information workload from other vehicle systems, i.e. changing radio, changing climate control, etc. . . . in determining the course of action.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. An embodiment of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A computer program product for providing a cruise control warning system, the product comprising:
   a storage medium readable by a processing circuit and storing instructions for execution by the processing circuit for performing a method comprising:
   monitoring a cruise control system to determine if the cruise control system is activated or deactivated for a vehicle;
   receiving vehicle operation data for the vehicle;
   determining a likelihood that a slippery road condition exists for the vehicle based on the vehicle operation data; and
   communicating a warning message indicating the potential slippery road condition to a driver of the vehicle when it has been determined that the likelihood that a slippery road condition exists is larger than a first pre-selected value and the cruise control system is activated; and
   transmitting a command to disable the cruise control system if the likelihood that a potential slippery road condition exists is over a second pre-selected value and the cruise control system is activated.

2. A method for providing a cruise control warning system, the method comprising:
   monitoring a cruise control system to determine if the cruise control system is activated or deactivated for a vehicle;
   receiving vehicle operation data for the vehicle;
   determining a likelihood that a slippery road condition exists for the vehicle based on the vehicle operation data;
   communicating a warning message to a driver of the vehicle when it has been determined that the likelihood of a slippery road condition is over a first pre-selected value and the cruise control system is activated; and
   transmitting a command to disable the cruise control system if the likelihood that a potential slippery road condition exists is over a second pre-selected value and the cruise control system is activated.

3. The method of claim 2 wherein the first pre-selected value is lower than the second pre-selected value.

4. The method of claim 2 wherein the likelihood that a slippery road condition exists is over the second pre-selected value if the vehicle operation data indicates that a windshield wiper has been activated.

5. The method of claim 2 wherein the likelihood that a slippery road condition exists is over the second pre-selected value if one or more of the following conditions are detected in the vehicle operation data for the vehicle;
   slippery roads, rain or snow specified by a broadcast on a vehicle broadcasting system for an area where the vehicle is located;
   windshield wipers have been activated; and
   low traction or wheel spinning.

6. The method of claim 2 wherein the likelihood that a slippery road condition exists is over the second pre-selected value if one or more of the following conditions are detected in the vehicle operation data for the vehicle:
   slippery roads, rain or snow by a broadcast on a vehicle broadcasting system for an area where the vehicle is located;
   an interior temperature control is set to high;
   an exterior temperature is below freezing;
   a front or rear defogger or defroster is set to on;
   windshield wipers have been activated; and
   low traction or wheel spinning.

7. The method of claim 2 further comprising transmitting a cruise control disabled message to the driver in response to said transmitting a command to disable the cruise control system.

8. The method of claim 2 wherein the warning message is transmitted to the driver via a driver display panel.

9. The method of claim 2 wherein the wanting message is transmitted to the driver verbally.

10. The method of claim 2 wherein a source for the vehicle operation data includes a broadcast on a vehicle broadcasting system.

11. The method of claim 2 wherein a source for the vehicle operation data includes at least one of a climate control system, a rear defroster system, a windshield wiper system and a traction control system.

12. The method of claim 2 wherein a source for tire vehicle operation data includes at least one of a rain sense sensor, a wheel spin sensor, a vehicle stability enhancement system, a radar and a camera.

13. The method of claim 2 wherein the likelihood that a slippery road condition exists is over the first pre-selected value if one or more of the following conditions are detected in the vehicle operation data for the vehicle:
   slippery roads, rain or snow is specified by a broadcast on a vehicle broadcasting system for an area where die vehicle is located;
   an interior temperature control that is set to high;
   an exterior temperature is below freezing;
   a front or rear defogger or defroster is set to on;
   a windshield wipers has been activated; and
   low traction or wheel spinning is detected.

14. The method of claim 2 wherein the likelihood that a slippery road condition exists is over the first pre-selected value if the vehicle operation data includes an indication that a windshield wiper has been activated.

15. The method of claim 2 wherein the vehicle operation data is real time data.

16. The method of claim 2 wherein the vehicle operation data is near-real time data.

17. The method of claim 2 wherein the cruise control system is an adaptive cruise control system.

18. A system for providing a cruise control warning system, the system comprising:
   a network; and
   a microprocessor in communication with the network, the microprocessor including instructions to implement a method comprising:
   monitoring a cruise control system to determine if the cruise control system is activated or deactivated for a vehicle;
   receiving vehicle operation data for the vehicle via the network;
   determining a likelihood that a slippery road condition exists for the vehicle based on the vehicle operation data; and
   communicating a warning message indicating the potential slippery road condition via the network to a driver of the vehicle when it has been determined that the likelihood a slippery road condition exists is over a first pre-selected value and the cruise control system is activated; and
   transmitting a command to disable the cruise control system if the likelihood that a potential slippery road condition exists is over a second pre-selected value and the cruise control system is activated.

19. A method for providing a cruise control warning system, the method comprising:

monitoring a cruise control system to determine if the cruise control system is activated or deactivated for a vehicle;

receiving vehicle operation data for the vehicle;

determining a likelihood that a condition adverse to the use of cruise control exists for the vehicle based on the vehicle operation data; and communicating a warning message identifying the potential condition adverse to the use of cruise control to a driver of the vehicle when it has been determined that the likelihood of a condition adverse to the use of cruise control is over a first pre-selected value and the cruise control system is activated; and transmitting a command to disable the cruise control system if the likelihood that a potential condition adverse to the use of cruise control exists is over a second pre-selected value and the cruise control system is activated.

* * * * *